United States Patent [19]

Omura

[11] Patent Number: 5,408,837
[45] Date of Patent: Apr. 25, 1995

[54] METHOD AND APPARATUS OF CONTROLLING AIR CONDITIONER

[75] Inventor: Naoki Omura, Fuji, Japan

[73] Assignee: Kabushiki Kaisha Toshiba, Kawasaki, Japan

[21] Appl. No.: 113,641

[22] Filed: Aug. 31, 1993

[30] Foreign Application Priority Data

Aug. 31, 1992 [JP] Japan .................................. 4-231237

[51] Int. Cl.⁶ .............................................. F25D 17/00
[52] U.S. Cl. ........................................ 62/89; 62/180; 62/158
[58] Field of Search ................. 62/180, 181, 183, 184, 62/157, 158, 231, 177, 89; 236/DIG. 9; 165/12, 40

[56] References Cited

U.S. PATENT DOCUMENTS

| 3,138,941 | 6/1964 | Jensen | 62/184 |
| 3,390,538 | 7/1968 | Miller | 62/184 X |
| 4,698,981 | 10/1987 | Kaneko et al. | 62/180 |

Primary Examiner—Harry B. Tanner
Attorney, Agent, or Firm—Foley & Lardner

[57] ABSTRACT

Outside air temperature detected by an outside air temperature sensor (13) is given to an outside air temperature memory (14), a comparator (15) and a fan volume control section (16), respectively. The fan volume control section (16) drives an outside fan motor (18) at a revolution speed determined by outside air temperature and revolution speed of a compressor. The outside air temperature memory (14) is activated in response to an operation start command to store the outside air temperature detected at the operation start therein. Further, a timer (17) is activated in response to the same operation start command, and a time-up signal (e.g., after 18 min has elapsed) is outputted from the timer to activate the comparator (15). The comparator (15) compares the outside air temperature detected at the operation start with that detected in response to the timer-up signal to check whether air short circuit occurs or not. In case of the air short circuit, the fan volume control section (16) outputs a detection signal of the short circuit to the outside fan motor (18), so that the outside fan motor (18) is driven at a speed higher than that determined under the ordinary conditions.

3 Claims, 3 Drawing Sheets

METHOD AND APPARATUS OF CONTROLLING AIR CONDITIONER

BACKGROUND OF THE INVENTION

1. Field of the Invention

The present invention relates to a method and apparatus of controlling an air conditioner, and more specifically to a method and apparatus of controlling a heat-pump type air conditioner provided with an outdoor apparatus, when an air short circuit has been detected.

2. Description of the Prior Art

In general, when an outdoor apparatus of an air conditioning apparatus is disposed so as to be opposed to a wall surface, a sufficiently large space is required between the outdoor apparatus and the wall surface. Otherwise, air blown out of the outdoor apparatus is sucked again into the same outdoor apparatus, thus causing an undesirable state referred to as air short circuit. Once the air short circuit arises, since the thermal exchange efficiency of the outside apparatus will be deteriorated, the air conditioning capacity is also inevitably reduced.

To overcome the above-mentioned problem, conventionally the outdoor apparatus 1 is usually disposed a sufficient installation distance A (e.g., about 60 cm) away from a wall surface, as shown in FIG. 5. In other words, in the case where the outdoor apparatus 1 cannot be disposed a sufficient distance A (60 cm or more) away from the wall surface, there exists a problem in that the air short circuit occurs, with the result that the capacity of the air conditioning apparatus is inevitably deteriorated.

On the other hand, in order to prevent the capacity of the air conditioning apparatus from being deteriorated, it may be possible to increase the revolution speed of a fan motor provided for the outdoor apparatus. In the case where the revolution speed of the fan motor speed is simply increased, however, noise inevitably increases and the motor efficiency inevitably decreases. Therefore, it is preferable to rotate the fan motor at as low a revolution speed as possible from the standpoints of reduction of noise and saving of energy. In other words, there exists a problem in that it is not desirable to simply increase the revolution speed of the outside fan motor.

SUMMARY OF THE INVENTION

With these problems in mind, therefore, it is the object of the present invention to provide a method and apparatus of controlling an air conditioner, by which the installation distance of the outdoor apparatus away from a wall surface can be reduced without reducing the capacity of the outdoor apparatus.

To achieve the above-mentioned object, the present invention provides a method of controlling an air conditioning apparatus, comprising the steps of: detecting outside air temperature in the vicinity of the outdoor heat exchanger at operation start; detecting outside air temperature after a predetermined time has elapsed; comparing the two detected outside air temperatures; and controlling air volume of an outdoor apparatus on the basis of the comparison result between the two detected outside air temperatures.

Further, the present invention provides a method of controlling an air conditioning apparatus provided with an indoor apparatus and an outdoor apparatus and controlling the revolution speed of an outside fan motor according to outside air temperature and revolution speed of a compressor, comprising the steps of: detecting outside air temperature at operation start; detecting outside air temperature after a predetermined time has elapsed; comparing the two detected outside air temperatures; and when a temperature difference between the two detected outside air temperatures exceeds a predetermined value, increasing the revolution speed of the outside fan motor beyond the revolution speed determined according to outside air temperature and the revolution speed of the compressor.

In the control method according to the present invention, the outside air temperature detected at the start of operation is compared with that detected after a predetermined time has elapsed. Further, the air volume blown out of the outside fan motor is controlled on the basis of the compared results of the two detected outside air temperatures. Accordingly, it is possible to reduce the installation space of the outdoor apparatus, without deteriorating the capacity of the outdoor apparatus.

Further, in the control method according to the present invention, the outside air temperature detected at the start of operation is compared with that detected after a predetermined time has elapsed. When the difference between the two detected outside air temperatures exceeds a predetermined value, the revolution speed of the outside fan motor is increased beyond the revolution speed determined according to outside air temperature and the revolution speed of the compressor. Accordingly, it is possible to prevent the capacity of the outdoor apparatus from being reduced even if air short circuit is produced.

DETAILED DESCRIPTION OF THE PREFERRED EMBODIMENTS

The embodiments of the control method of the present invention will be described in detail hereinbelow with reference to the attached drawings.

Figure 1:
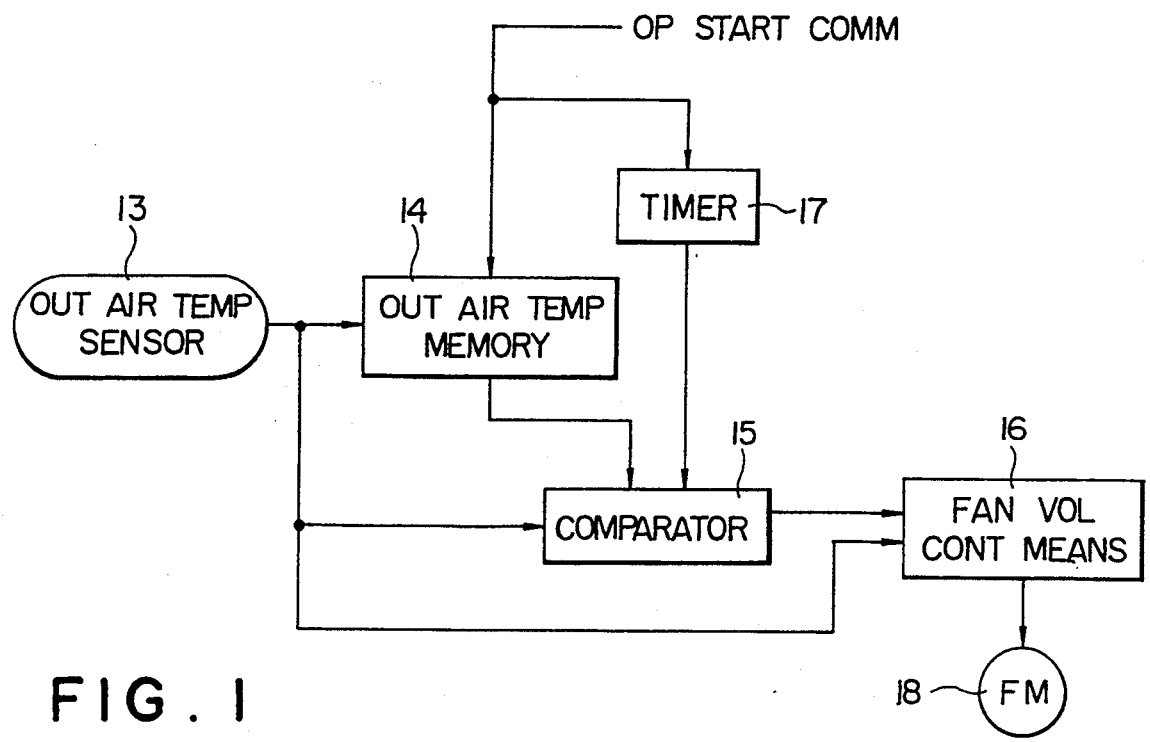
FIG. 1 is a block diagram showing an outdoor apparatus of an air conditioning apparatus, to which the control method according to the present invention is applied.
Figure 2:
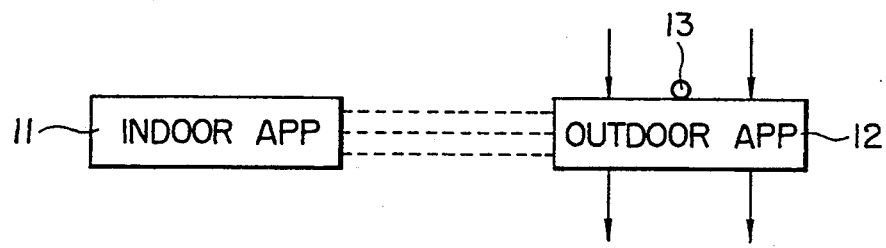
FIG. 2 is a block diagram showing both an indoor apparatus and the outdoor apparatus of the air conditioning apparatus, to which the control method according to the present invention is applied.

FIG. 2 is a block diagram showing a heat-pump type conditioning apparatus provided with both an indoor apparatus (indoor heat exchanger) 11 and an outdoor apparatus (outdoor heat exchanger) 12, to which the control method of the present invention is applied. FIG. 1 is a block diagram showing the outdoor apparatus 12. The outdoor apparatus 12 comprises an outside air temperature sensor 13 which is arranged in the vicinity of the outdoor heat exchanger, an outside air temperature memory 14, a comparator 15, a fan volume control section or means 16, a timer 17, and a motor 18 for an outside fan which is used to exchange heat between the outdoor heat exchanger and the ambient air.

The outside air temperature sensor 13 is attached to the air suction side in the vicinity of the outdoor apparatus 12 to detect the outside air temperature TO as shown in FIG. 2. The outside air temperature TO detected by the outside air temperature sensor 13 is inputted to the outside air temperature memory 14, the comparator 15, and the fan volume control means 16, respectively, as shown in FIG. 1.

The outside air temperature memory 14 is activated in response to an operation start command to store the detected outside air temperature TO whenever the operation of the air conditioning apparatus starts.

The timer 17 is also activated in response to the operation start command and outputs a time-up signal after a predetermined time (e.g., 18 min) has elapsed from the start of the apparatus operation.

The comparator 15 is activated in response to the time-up signal of the timer 17 to compare the outside air temperature TO detected and stored at the start of the operation with that TO-M detected after the predetermined time (e.g., 18 min) has elapsed. When a difference in outside air temperature between the two is more than a predetermined value (e.g., 7° C.), the comparator 15 discriminates that an air short circuit is detected, and outputs a detection signal to the fan volume control means 16.

In ordinary conditions, the fan volume control means 16 drives the outside fan motor 18 at a revolution speed previously determined in accordance with the relationship between the outside air temperature TO detected by the outside air temperature sensor 13 and the revolution speed of a compressor (not shown). In the case where the detection signal indicative of air short circuit is applied from the comparator 15, the fan volume control means 16 drives the outside fan motor 18 at a revolution speed higher than that previously determined. For control of the revolution speed of the outside fan motor 18, the outside fan motor 18 is provided with 5 taps, for instance. When the fan volume control section 16 is connected selectively to one of these taps, the preset revolution speed of the fan motor 18 can be changed to various values as listed in Table 1 below:

TABLE 1

| MOTOR TAPS | L | L+ | M | M+ | H |
|---|---|---|---|---|---|
| r.p.m. | 300 | 400 | 500 | 600 | 700 |

On the other hand, the tap position of the outside fan motor 10 is previously determined on the basis of the relationship between the outside air temperature TO and the speed of the compressor as follows:

Under ordinary conditions (no air short circuit is detected) and in heating operation, the tap position of the outside fan motor 18 is determined as listed in Table 2 below. Further, under the ordinary conditions (no air short circuit is detected) and in cooling operation, the tap position of the outside fan motor 18 is determined as listed in Table 3 below:

TABLE 2

| | (HEAT) | | |
|---|---|---|---|
| TO/COMPR SPEED | LOW | MEDIUM | HIGH |
| TO ≧ 5° C. | L | M | M |

TABLE 2-continued

| | (HEAT) | | |
|---|---|---|---|
| TO/COMPR SPEED | LOW | MEDIUM | HIGH |
| TO < 5° C. | M | M | H |

TABLE 3

| | (COOL) | | |
|---|---|---|---|
| TO/COMPR SPEED | LOW | MEDIUM | HIGH |
| TO ≧ 18° C. | L | M | M |
| TO < 18° C. | L | L | M |

As listed above, under ordinary conditions, the preset speed of the outside fan motor 18 is determined by use of taps of the fan motor 18 on the basis of the outside air temperature and the revolution speed of the compressor under due consideration of the noise and the capacity of the air conditioning apparatus.

On the other hand, under the short circuit conditions (an air short circuit is detected by the comparator 15) and in heating operation, the tap position of the outside fan motor 18 is determined as listed in Table 4 below. Further, under the short circuit conditions (an air short circuit is detected by the comparator 15) and in cooling operation, the tap position of the outside fan motor 18 is determined as listed in Table 5 below:

TABLE 4

| | (HEAT) | | |
|---|---|---|---|
| TO/COMPR SPEED | LOW | MEDIUM | HIGH |
| TO ≧ 5° C. | L+ | M+ | M+ |
| TO < 5° C. | M+ | M+ | H+ |

TABLE 5

| | (COOL) | | |
|---|---|---|---|
| TO/COMPR SPEED | LOW | MEDIUM | HIGH |
| TO ≧ 18° C. | L+ | M+ | M+ |
| TO < 18° C. | L+ | L+ | M+ |

As listed above, under the short circuit conditions, the preset speed of the outside fan motor 18 is determined to be higher than that under the ordinary conditions, by shifting the tap position of the fan motor 18 to the side on which a higher revolution speed of the fan motor 18 can be obtained.

Here, the method of detecting the short circuit will be described hereinbelow. In the case where the outdoor apparatus 12 is enclosed by walls, for instance and thereby the air short circuit occurs, the outside air temperature TO changes distinguishably within a predetermined time period, as compared with the case of the ordinary conditions. In more detail, in the heating operation, the outside air temperature TO under the short circuit conditions decreases with increasing lapse of time more distinguishably, as compared with that under the ordinary conditions. Further, in the cooling operation, the outside air temperature TO under the short circuit conditions increases with increasing lapse of time more distinguishably, as compared with that under the ordinary conditions. In the present invention, the air short circuit is detected on the basis of the above-mentioned change rate in the outside air temperature TO with the lapse of time.

Figure 4:
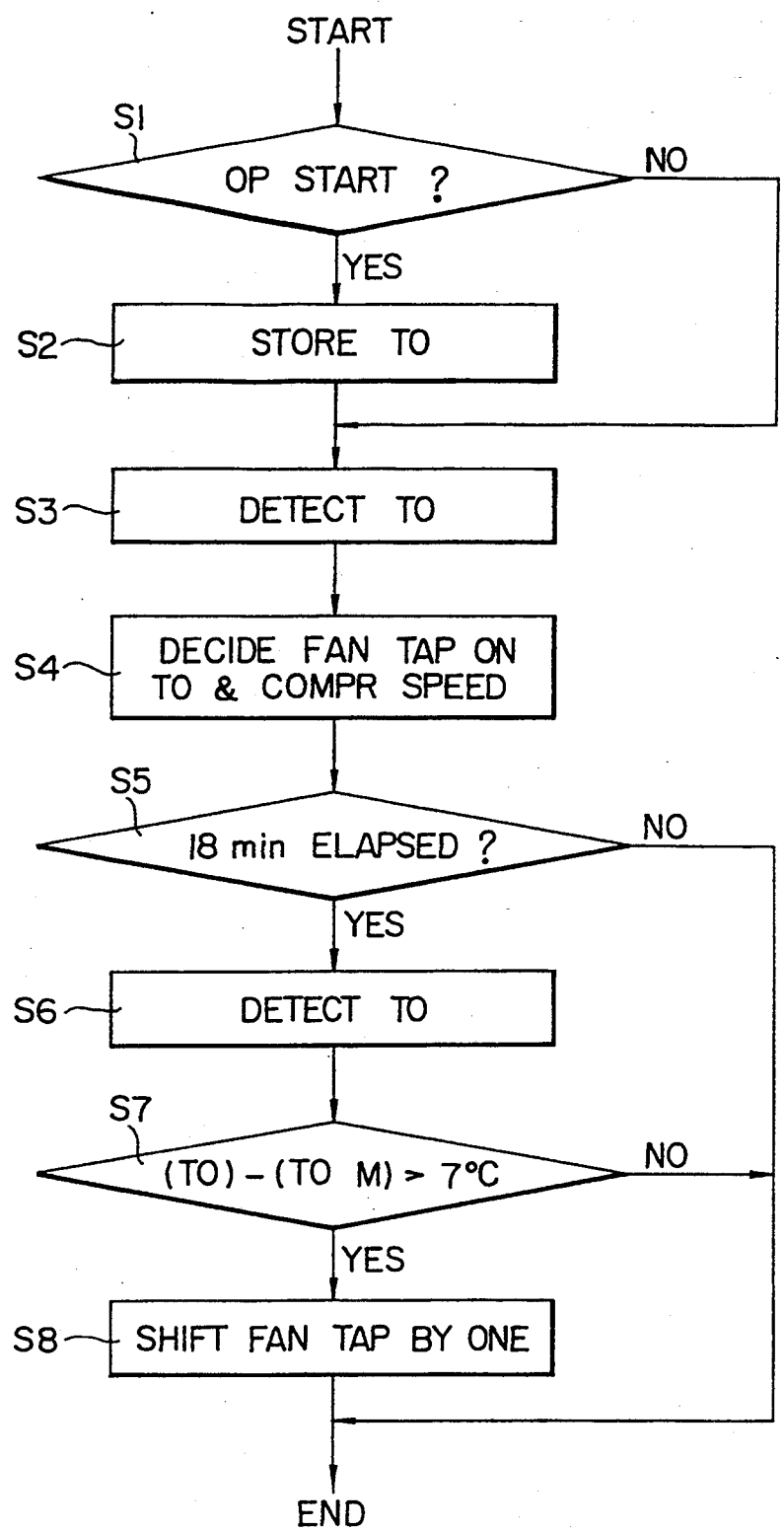
FIG. 4 is a flowchart for assistance in explaining the procedure from when the air conditioning apparatus is started to when one of speed taps of the outside fan motor is decided.

The control procedure of the fan volume control means 16 of the present invention will be described hereinbelow with reference to a flowchart shown in FIG. 4.

First, a start of the operation of the air conditioning apparatus is detected (in step S1). If the operation start is detected, an outside air temperature TO-M at the operation start is detected and stored in the outside air temperature memory 14 (in step S2). Further, if the operation start is not detected in step S2, the outside air temperature TO is detected continuously without storing the detected temperature TO (in step S3).

Successively, the control means 16 decides a tap position (L, M and H) of the outside fan motor 18 on the basis of the relationship between the outside air temperature TO detected in step S3 and the revolution speed of the compressor as listed in Tables 2 and 3 stored in the control means 16 (in step S4). Therefore, the outside fan motor 18 is driven at a preset speed determined under the ordinary conditions.

Further, the control means 16 discriminates whether a predetermined time (e.g., 18 min) has elapsed (in step S5). If a predetermined time has elapsed, the outside air temperature TO is detected at this time (in step S6). The control means 16 further compares the detected outside air temperature TO detected 18 min after the start of the operation with the outside air temperature TO-M (at the operation start) stored in the outside air memory 14 to check whether the difference between the two is more than 7° C., for instance (in step S7). If the temperature difference between the two (TO - TO-M) is higher than 7° C., the control means 16 determines that an air short circuit exists, and shifts the tap position of the outside fan motor 18 from the ordinary tap position (L or M) to the short circuit tap position (L+ or M+) to increase the fan motor speed (in step S8).

Figure 5:
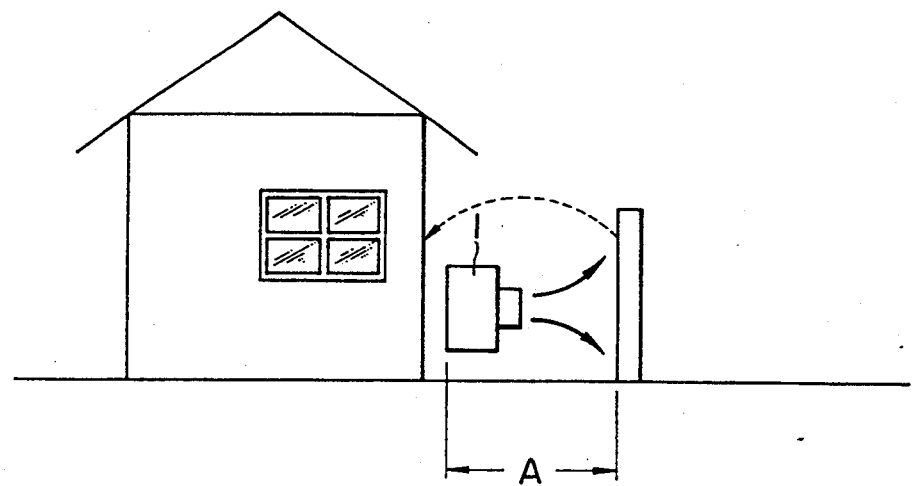
FIG. 5 is an illustration for assistance in explaining the installation space A of the outdoor apparatus.

As described above, in the control method of the present invention, since the tap position of the outside fan motor 18 is shifted by one to a higher speed side under the short circuit conditions in order that the outside fan motor speed can be increased, it is possible to reduce the installation space A as shown in FIG. 5 without deteriorating the capacity of the outdoor apparatus 1.

Figure 3:
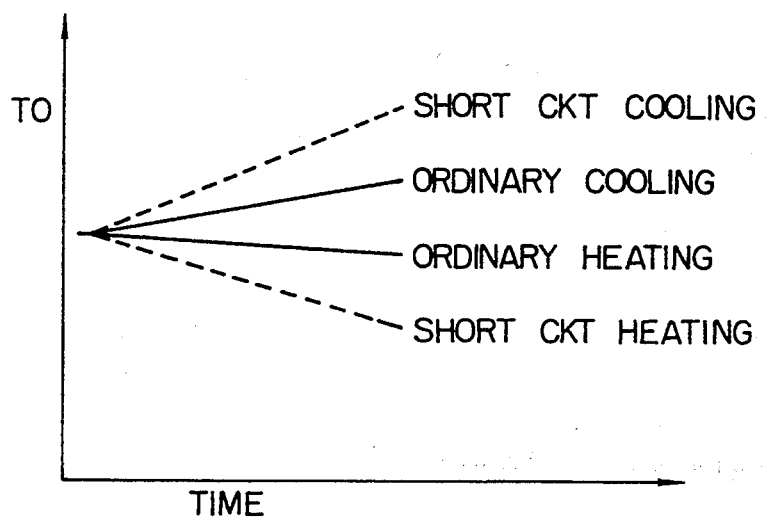
FIG. 3 is a graphical representation showing changes in outside air temperature TO with the lapse of time in both heating and cooling operation, under comparison between when the air short circuit occurs and when no air short circuit (the ordinary operation) occurs.

Further, in the above-mentioned embodiment, the air short circuit has been detected on the basis of the comparison of the outside air temperature TO-M detected at the operation start with that TO detected after a predetermined time has elapsed from the operation start. Without being limited thereto, however, it is also possible to detect the short circuit by detecting the change rate in the outside air temperature TO continuously for a predetermined time period, after the operation start, on the basis of the characteristics as shown in FIG. 3.

What is claimed is:

1. A method of controlling an air conditioning apparatus, comprising the steps of:
   detecting outside air temperature in the vicinity of an outdoor heat exchanger at operation start;
   detecting outside air temperature after a predetermined time has elapsed;
   comparing the two detected outside air temperatures; and
   controlling revolution speed of an outdoor fan motor on the basis of the comparison result between the two outside air temperatures.

2. A method of controlling an air conditioning apparatus provided with an indoor apparatus and an outdoor apparatus and controlling revolution speed of an outside fan motor according to outside air temperature and revolution speed of a compressor, comprising the steps of:
   detecting outside air temperature in the vicinity of an outdoor heat exchanger at operation start;
   detecting outside air temperature after a predetermined time has elapsed;
   comparing the two detected outside air temperatures; and
   when a temperature difference between the two detected outside air temperatures exceeds a predetermined value, increasing the revolution speed of the outside fan motor beyond the revolution speed determined according to outside air temperature and the revolution speed of the compressor.

3. An apparatus for controlling an air conditioning apparatus, comprising:
   means for detecting outside air temperature in the vicinity of an outdoor heat exchanger at operation start;
   means for detecting outside air temperature after a predetermined time has elapsed;
   means for comparing the two detected outside air temperatures; and
   means for controlling revolution speed of an outdoor fan motor on the basis of the comparison result between the two outside air temperatures.

* * * * *